(12) United States Patent
Triandopoulos et al.

(10) Patent No.: US 9,813,244 B1
(45) Date of Patent: Nov. 7, 2017

(54) DISTRIBUTED PROACTIVE PASSWORD-BASED SECRET SHARING

(71) Applicant: EMC IP Holding Company LLC, Hopkinton, MA (US)

(72) Inventors: Nikolaos Triandopoulos, Arlington, MA (US); Yupeng Zhang, College Park, MD (US)

(73) Assignee: EMC IP Holding Company LLC, Hopkinton, MA (US)

( * ) Notice: Subject to any disclaimer, the term of this patent is extended or adjusted under 35 U.S.C. 154(b) by 42 days.

(21) Appl. No.: 14/984,389

(22) Filed: Dec. 30, 2015

(51) Int. Cl.
*H04L 9/08* (2006.01)
*H04L 9/30* (2006.01)
*H04L 29/06* (2006.01)

(52) U.S. Cl.
CPC ........ *H04L 9/3093* (2013.01); *H04L 63/0428* (2013.01); *H04L 2209/24* (2013.01)

(58) Field of Classification Search
CPC .......................... H04L 9/3093; H04L 63/0428
USPC .................................................. 380/277–282
See application file for complete search history.

(56) References Cited

U.S. PATENT DOCUMENTS

| | | | |
|---|---|---|---|
| 7,421,080 B2* | 9/2008 | Matsumura | H04L 9/085 380/277 |
| 8,335,915 B2* | 12/2012 | Plotkin | G06F 21/85 380/277 |
| 8,484,259 B1* | 7/2013 | Makkar | G06F 17/30997 707/769 |
| 8,630,409 B2* | 1/2014 | Woodruff | H04L 9/008 380/28 |
| 8,745,415 B2* | 6/2014 | Miller | H04L 63/061 380/277 |

(Continued)

OTHER PUBLICATIONS

Li et al., "Novel space efficient secret sharing for implicit data security," 2012 8th International Conference on Information Science and Digital Content Technology (ICIDT2012) Year: 2012, vol. 2 pp. 283-286.*

(Continued)

*Primary Examiner* — Roderick Tolentino
(74) *Attorney, Agent, or Firm* — Ryan, Mason & Lewis, LLP

(57) ABSTRACT

Distributed proactive threshold password-based secret sharing schemes are provided. An exemplary method comprises obtaining a difference between updated and prior values of a share for at least one fixed-share party. The updated value comprises a fixed share that is one of a plurality of shares of a secret held by a plurality of parties. A fixed-share party randomly selects a first correction polynomial employed by a polynomial-based secret sharing scheme such that at least one polynomial coefficient corresponding to the fixed-share party is a value that depends on the difference. A non-fixed-share party randomly selects a second correction polynomial such that at least one corresponding polynomial coefficient corresponding to the non-fixed-share party is approximately zero. A polynomial coefficient of the second correction polynomial is obtained from the non-fixed-share party and the fixed share is updated by combining the prior value of the share with the at least one corresponding polynomial coefficient of the first correction polynomial and the polynomial coefficient of the second correction polynomial.

20 Claims, 6 Drawing Sheets

---

DISTRIBUTED PROACTIVIZATION OF PBSS PROCESS 400
FOR MULTIPLE PASSWORDS AND ACTIVE SECURITY

1. For $i = 1, 2, \ldots, m$, $P_{l_i}$ announces that it wants to update its share to a fixed value and sets its share to $s_{l_i} = \pi'_i$ 2. For $i = 1, 2, \ldots, m$, $P_{l_i}$ chooses randomly a correction polynomial $\delta_{l_i}(\cdot)$ randomly such that $\delta_{l_i}(l_i) = \Delta_i$, $\delta_{l_i}(0) = 0$ and $\forall j \in \{1, \ldots, m\} \setminus \{i\}$, $\delta_{l_i}(l_j) = 0$ 3. $\forall i \notin \{l_1, \ldots, l_m\}$, $P_i$ chooses randomly a correction polynomial $\delta_i(\cdot)$ such that $\delta_i(0) = 0$ and $\forall j \in \{1, \ldots, m\}$, $\delta_i(l_j) = 0$ 4. $\forall i$, $P_i$ sends $\delta_i(j)$ to $P_j$, $\forall j \neq i$ 5. $\forall i \in \{l_1, \ldots, l_m\}$, $P_i$ updates its share to $s_{i'} = s_i + \sum_{j=1}^{n} \delta_j(i)$ 6. Optionally, parties engage into a share verification process to verify the correctness of all correction polynomials chosen by the parties and accordingly resolve possible conflicts via an accusation phase.

(56) References Cited

U.S. PATENT DOCUMENTS

| | | | |
|---|---|---|---|
| 2009/0041249 A1* | 2/2009 | Tanaka | G06Q 20/3829 380/277 |
| 2010/0005302 A1* | 1/2010 | Vishnu | H04L 9/085 713/171 |
| 2010/0131755 A1* | 5/2010 | Zhu | H04L 63/0815 713/155 |
| 2010/0172495 A1* | 7/2010 | Califano | H04L 9/3236 380/30 |
| 2011/0211701 A1* | 9/2011 | Grall | H04L 9/0844 380/283 |

OTHER PUBLICATIONS

Sathik et al., "Secret sharing scheme for data encryption based on polynomial coefficient," 2010 Second International conference on Computing, Communication and Networking Technologies Year: 2010 pp. 1-5.*

* cited by examiner

FIG. 4

DISTRIBUTED PROACTIVIZATION OF PBSS PROCESS 400 FOR MULTIPLE PASSWORDS AND ACTIVE SECURITY

1. For $i = 1,2,\ldots,m$, $P_{l_i}$ announces that it wants to update its share to a fixed value and sets its share to $s_{l_i} = \pi'_i$ 2. For $i = 1,2,\ldots,m$, $P_{l_i}$ chooses randomly a correction polynomial $\delta_{l_i}(\cdot)$ randomly such that $\delta_{l_i}(l_i) = \Delta_i$, $\delta_{l_i}(0) = 0$ and $\forall j \in \{1,\ldots,m\} \setminus \{i\}$, $\delta_{l_i}(l_j) = 0$ 3. $\forall i \notin \{l_1,\ldots,l_m\}$, $P_i$ chooses randomly a correction polynomial $\delta_i(\cdot)$ such that $\delta_i(0) = 0$ and $\forall j \in \{1,\ldots,m\}$, $\delta_i(l_j) = 0$ 4. $\forall i$, $P_i$ sends $\delta_i(j)$ to $P_j$, $\forall j \neq i$ 5. $\forall i \in \{l_1,\ldots,l_m\}$, $P_i$ updates its share to $s_{i'} = s_i + \sum_{j=1}^{n} \delta_j(i)$ 6. Optionally, parties engage into a share verification process to verify the correctness of all correction polynomials chosen by the parties and accordingly resolve possible conflicts via an accusation phase.

*FIG. 5*

PUBLIC SHARES UPDATE PROCESS 500

(a) Let $g(\cdot) = f(\cdot) + \sum_{i=1}^{n} \delta_i(\cdot)$ be the refreshed polynomial after the proactivization phase, that is, $\forall i, s'_i = g(i)$ when the share-correction computation is executed correctly. For simplicity, assume that each public share is managed by a party $j \in \{n+1,\ldots,n+t-1\}$.

(b) For each $i = 1, 2, \ldots, n$, $P_i$ chooses a random polynomial $\gamma_{ij}(\cdot)$ of degree $2t - 2$ for each $j = n + 1, \ldots, n + t - 1$ such that $\gamma_{ij}(j) = 0$.

(c) For each $i = 1, 2, \ldots, n$ and $j = n + 1, \ldots, n + t - 1$, $P_i$ sends $\gamma_{ij}(k)$ to $P_k$ $\forall k \in \{1, 2, \ldots, n\} \setminus \{i\}$.

(d) For each $i = 1, 2, \ldots, n$ and $j = n + 1, \ldots, n + t - 1$, $P_i$ computes $r_{ij} = s'_i + \sum_{k=1}^{n} \gamma_{ij}(i)$ and sends it to party $j$ that controls the corresponding public share.

(e) For each $j = n + 1, \ldots, n + t - 1$, party $j$ receives $n$ points on the polynomial $h(\cdot) = g(\cdot) + \sum_{i=1}^{n} \gamma_{ij}(\cdot)$. It interpolates the polynomial and computes $h(j) = g(j) + \sum_{i=1}^{n} \gamma_{ij}(j) = g(j)$. $h(j)$ is published as a public share.

FIG. 6

FIXED-SHARE PARTY SHARE VERIFICATION PROCESS 600

1. Computes and broadcasts $d = g^{\delta_{l_i}(s)}$.

2. Computes the polynomial $p(x) = (\delta_{l_i}(x) - \Delta_i)/(x - l_i)$ and broadcasts $w_1 = g^{p(s)}$.

3. Computes the polynomial $q(x) = \delta_{l_i}(x)/(x \cdot \Pi_{j \in \{1,\ldots,m\} \setminus \{i\}}(x - l_j))$ and broadcasts $w_2 = g^{q(s)}$.

4. Computes the polynomial $t(x) = x \cdot \Pi_{j \in \{1,\ldots,m\} \setminus \{i\}}(x - l_j)$ and broadcasts $w_3 = g^{t(s)}$.

5. For every other party $P_j$, computes $w_j(x) = (\delta_{l_i}(x) - \delta_{l_i}(j))/(x - j)$ and sends $\delta_j = \delta_{l_i}(j)$, $w_4 = g^{w_j(s)}$ to $P_j$.

*FIG. 7*

NON-FIXED-SHARE PARTY SHARE VERIFICATION PROCESS 700

1. $e(d/g^{\delta_j}, g)(g^{s-j}, w_4)$. This checks if $\delta_j$ is the evaluation of $\delta_{l_i}(\cdot)$ at point $j$, which corresponds to property (4).

2. $e(d/g^{\Delta_i}, g)(g^{s-l_i}, w_1)$. This checks if the exponent of $g^{\Delta_i}$ is the evaluation of $\delta_{l_i}(\cdot)$ at point $l_i$, which corresponds to property (3).

3. $e(d, g)(w_2, w_3)$. This checks if the polynomial on the exponent of $d$ is the product of two polynomials on the exponent of $w_2$ and $w_3$.

4. Selects randomly $r \in Z_p$ and sends $r$ to $P_{l_i}$.

5. Upon receiving $r$ from $P_j$, $P_{l_i}$ computes $t(r)$ and $u(x) = (t(x) - t(r))/(x - r)$. It sends $w_5 = t(r)$ and $w_6 = g^{u(s)}$ back to $P_j$.

6. $P_j$ checks $e(w_2/g^{w_5}, g)(g^{s-r}, w_6)$ and $w_5 \cdot \prod_{j \in \{1,...,m\} \setminus \{i\}} (r - l_j)$. This checks if $w_2 = g^{t(s)}$. Together with check 3, the polynomial on the exponent of $d$ has a factor $t(x)$, which corresponds to property (1) and (2).

DISTRIBUTED PROACTIVE PASSWORD-BASED SECRET SHARING

CROSS-REFERENCE TO RELATED APPLICATIONS

The present application is related to U.S. patent application Ser. No. 14/319,276, filed Jun. 30, 2014, entitled "System and Method for Key Material Protection on Devices Using a Secret Sharing Scheme," (now U.S. Pat. No. 9,461,821); U.S. patent application Ser. No. 14/577,206, filed Dec. 19, 2014, entitled "Protection of a Secret on a Mobile Device Using a Secret-Splitting Technique with a Fixed User Share;" (now U.S. Pat. No. 9,455,968) U.S. patent application Ser. No. 14/672,507, filed Mar. 30, 2015, entitled "Methods and Apparatus for Password-Based Secret Sharing Scheme;" and U.S. patent application Ser. No. 14/962,606, filed Dec. 8, 2015, entitled "Proactivized Threshold Password-Based Secret Sharing with Flexible Key Rotation," each incorporated by reference herein.

FIELD

The present invention relates to the protection of secret keys and other information in devices.

BACKGROUND

To strengthen the security of computer systems against network intrusions and server compromises, key splitting is often applied in order to split a secret state (typically a key) of a system into a number of "partial states," or shares (typically, randomly chosen), which are then dispersed into a number of parties, or share holders (typically, computing devices). Then, the task of an attacker is much harder: Leakage of the full secret state requires that the attacker gets access to a sufficiently large number of the shares.

However, any key splitting method is eventually prone to compromise of the full secret state of the system if the attacker is launching a perpetual attack where devices or servers that hold the shares are gradually compromised until a large enough number of shares are possessed by the attacker to successfully reconstruct the split secret state. Therefore, it is often desirable for key splitting to be complemented by a proactivization mechanism that refreshes the current set of shares, or sharing, into a new set of shares, often referred to as a new sharing. In this manner, new shares can be used to reconstruct the same split key, yet they are uncorrelated with the old shares. That is, the current share(s) that an attacker possesses become useless once a new sharing replaces the current sharing.

Many efficient proactivization techniques exist for various secret sharing schemes. In particular, Amir Herzberg et al., "Proactive Secret Sharing or: How to Cope with Perpetual Leakage," Advances in Cryptology—CRYPTO '95, Proc. 15th Annual Int'l Cryptology Conf., 339-352 (Aug. 27-31, 1995) shows an efficient proactivization of Shamir's sharing scheme (see, e.g., A. Shamir, "How to Share a Secret," Communications of the Ass'n of Computer Machinery, Vol. 22, No. 11, 612-13 (1979)), in a distributed manner so that share holders can jointly compute random correction shares that, when individually combined with the current shares, can produce refreshed, new shares. Notably, this joint computation remains secure even if one or more (but up to a threshold value) of the participating share holders are compromised by an attacker.

U.S. patent application Ser. No. 14/672,507, filed Mar. 30, 2015, entitled "Methods and Apparatus for Password-Based Secret Sharing Scheme," incorporated by reference herein, discloses a password-based secret sharing (PBSS) mechanism (for threshold and generic secret sharing). PBSS allows for one or more of the shares to be fixed, that is, to take predetermined values that are independent of the split secret (e.g., independent of the shared key), and thus are not necessarily randomly chosen. U.S. patent application Ser. No. 14/577,206, filed Dec. 19, 2014, entitled "Protection of a Secret on a Mobile Device Using a Secret-Splitting Technique with a Fixed User Share," (now U.S. Pat. No. 9,455,968), incorporated by reference herein, discloses a key-splitting framework where the key splitting employs a user's password or other personal secret information as a share. Shares that are not fixed in a given sharing are referred to as non-fixed shares.

U.S. patent application Ser. No. 14/962,606, filed Dec. 8, 2015, entitled "Proactivized Threshold Password-Based Secret Sharing with Flexible Key Rotation," incorporated by reference herein, discloses a proactivization technique for threshold PBSS. In one or more embodiments, shares are being refreshed by a trusted entity (possibly one of the current share-holder devices). The trusted entity is responsible to choose the randomness that is needed to produce the random correction shares that are employed for producing the new refreshed sharing of the secret. Such a trusted entity may not be available, however, when a new sharing is needed.

Therefore, a need remains for distributed proactive techniques for PBSS that do not require the use of a centralized trusted entity during proactivization.

SUMMARY

Illustrative embodiments of the present invention provide methods and apparatus for distributed proactive threshold password-based secret sharing. In one exemplary embodiment, a method comprises obtaining a difference between an updated value of a share and a prior value of the share for at least one fixed-share party, wherein the updated value comprises a fixed share that is one of a plurality of shares of a secret, wherein the plurality of shares are held by a plurality of parties; substantially randomly selecting, by the at least one fixed-share party, a first correction polynomial employed by a polynomial-based secret sharing scheme such that at least one polynomial coefficient corresponding to the at least one fixed-share party is a value that depends on the difference, wherein at least one non-fixed-share party substantially randomly selects a second correction polynomial such that at least one corresponding polynomial coefficient corresponding to the at least one non-fixed-share party is approximately zero; obtaining the at least one corresponding polynomial coefficient of the second correction polynomial from the at least one non-fixed-share party, and updating the fixed share by combining the prior value of the share with the at least one corresponding polynomial coefficient of the first correction polynomial and the at least one corresponding polynomial coefficient of the second correction polynomial.

In one or more embodiments, the polynomial-based secret sharing scheme comprises a $(2t-1, n)$ secret sharing scheme for the plurality, n, of parties, wherein t shares comprise a minimal authorized set needed for reconstruction of the secret and wherein $t-1$ of the plurality of shares comprise public shares, wherein the first and second correction polynomials are of degree $2t-2$, and wherein the public shares are updated by substantially randomly selecting, by each of the fixed-share parties and the non-fixed-share parties, a third correction polynomial employed by the polynomial-based secret sharing scheme for each party managing a public share, such that coefficients corresponding to the public share parties are approximately zero; wherein each of the fixed-share parties, the non-fixed-share parties and the public share parties sends corresponding coefficients to others of the fixed-share parties, the non-fixed-share parties and the public share parties; wherein each of the fixed-share parties, the non-fixed-share parties and the public share parties computes an update value for a given public share and sends the update value for the given public share to the corresponding public share party, and wherein the corresponding public share party computes the corresponding public share and publishes the corresponding public share.

At least one embodiment further comprises the steps of verifying, for the at least one fixed-share party by at least one additional party, that a coefficient corresponding to the secret is approximately zero, that coefficients of the first correction polynomial corresponding to each additional fixed-share party are approximately zero, a fourth correction polynomial raised to a power based on coefficients of the first correction polynomial corresponding to each of the fixed-share parties is set to the fourth correction polynomial raised to a desired shift of the respective fixed-share party, providing, by the fixed-share parties, the fourth correction polynomial raised to the respective desired shift; and verifying, by the fixed-share parties, that a received shift is substantially equal to an evaluation of the first correction polynomial at a point corresponding to the respective fixed-share party.

Embodiments of the invention can be implemented in a wide variety of different devices and applications for the protection of key material or other protected material using distributed proactive threshold password-based secret sharing schemes.

BRIEF DESCRIPTION OF THE DRAWINGS

FIG. 4 is a flow chart illustrating an exemplary embodiment of a process for distributed proactive PBSS for multiple passwords and active security;

FIG. 5 is a flow chart illustrating an exemplary embodiment of a public shares update process for the distributed proactive PBSS process of FIG. 4;

FIGS. 6 and 7 are flow charts illustrating exemplary embodiments of share verification processes for fixed-share parties and non-fixed-share parties, respectively, for an improved distributed proactive PBSS process;

DETAILED DESCRIPTION

Figure 1:
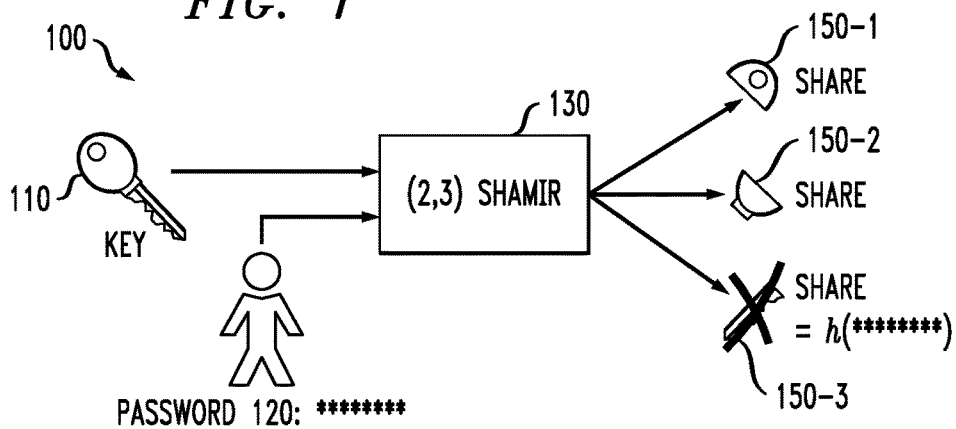
FIG. 1 illustrates an exemplary password-based secret sharing technique.

Illustrative embodiments of the present invention will be described herein with reference to exemplary communication systems and associated servers, clients and other processing devices. It is to be appreciated, however, that the invention is not restricted to use with the particular illustrative system and device configurations shown.

Aspects of the invention provide split-key based cryptography techniques for data protection and synchronization across multiple computing devices of a user. In one or more exemplary embodiments of the invention, split-key based cryptography techniques are employed for sensitive data protection, recovery and secure synchronization across multiple devices of a user. The user devices can include portable and/or non-portable computing devices, such as smartphones, tablets, desktop computers and/or laptop computers. In this manner, users can synchronize protected content across all or a subset of their devices.

One or more embodiments of the invention provides novel distributed proactivization protocols for PBSS. Protocols are presented for employing one or more fixed shares (e.g., passwords) in a new sharing. In one or more embodiments, security is improved to substantially prevent leakage to the attacker of information about the correction shares. The efficiency of the disclosed protocols is optionally improved using techniques from verifiable computing that are related to polynomial evaluations. Additional optional extensions are presented that achieve optimizations and/or new performance tradeoffs of the PBSS scheme.

In one or more embodiments, the disclosed protocols are distributed and can be implemented solely by some of the share holders, thus achieving better practicality.

In highly adversarial environments, where an attacker actively seeks to learn the shares into which a secret key has been split (for instance, by compromising the devices storing such shares or by eavesdropping over communications transmitting such shares), it is desirable to periodically refresh not only the shares but also the secret key itself, so that the likelihood that the attacker learns a number of valid shares that is above the reconstruction threshold or, overall, the currently valid secret key is significantly reduced. Such refreshing of the secret key and its associated shares is collectively referred to as key rotation.

It is often desirable to refresh existing shares through proactivization. Here, assuming that the secret key remains unchanged, some randomized correction shares are computed (without knowledge of the split secret key), and such correction shares are distributed to parties holding the secret shares, where they are eventually individually combined with (e.g., added to) the existing shares to produce the refreshed shares. For instance, if a secret k is additively shared into shares $k_1$ and $k_2$, then the correction shares can be r and $-r$, where r is a random value, finally producing new shares $k_1+r$, $k_2-r$, which still correctly reconstruct the secret as $k_1+r+(k_2-r)=k_1+k_2=k$. Computation of the correction values can be performed by a trusted entity (i.e., the dealer) or jointly by the parties possessing the shares. For instance, in the example above, two correction values per share may be considered, namely, $r_1$, $r_2$ for $k_1$ and $-r_1$, $-r_2$ for $k_2$, where $r_1$, $r_2$ are randomly chosen by the parties holding respectively $k_1$ and $k_2$.

Preliminaries

Shamir's Secret Sharing Scheme:

In Shamir's Secret sharing model as discussed further below in conjunction with FIGS. 1 and 3, a trusted dealer has a secret and wants to distribute one share of the secret to each party so that any adversary with up to t−1 shares can gain no information about the secret, while anyone with t shares can reconstruct the secret. Shamir's scheme works as follows. The secret w lies in a finite field $\mathbb{Z}_q$, where q is a large prime. The dealer randomly chooses $a_1, a_2, \ldots, a_{t-1} \in \mathbb{Z}_q$ to define a polynomial $f(\cdot)$ of degree $t-1$ with $f(x)=w+a_1x+a_2x^2+\ldots+a_{t-1}x^{t-1}$, and privately delivers to party $P_i \in \{P_1, P_2, \ldots, P_n\}$ the share $s_i=(i, f(i))$. Then, t (or more) shares suffice to reconstruct the polynomial f by Lagrange interpolation and thus the secret $w=f(0)$, but any $t-1$ shares are fully and equi-probably consistent with any possible value $w' \in \mathbb{Z}_q$ of the secret, thus any $t-1$ or less shares leak no information about the secret.

Proactivized Shamir's Scheme:

Shamir's Secret Sharing Scheme guarantees that an adversary cannot learn the secret as long as the adversary has access to no more than $t-1$ share during the lifetime of the secret, which is a strong assumption. A sophisticated adversary will instead gradually corrupt additional parties in order to reach the reconstruction threshold t. To prevent against such perpetual leakage of shares to an adversary, and thus provide stronger security, share proactivization can be employed, according to which the shares of all parties are updated periodically in such a way so that old shares cannot be recovered with the new shares, and the secret remains unchanged. With this share proactivization in place, an adversary must learn t or more shares in one epoch (proactivization period) in order to successfully reconstruct the secret.

Herzberg et al., referenced above, proposed share proactivization as follows. In the initialization phase, the dealer distributes the shares following Shamir's Secret Sharing Scheme and vanishes. During the update phase (e.g., at the beginning of each epoch), each party $P_i$ comes up with a random polynomial $\delta_i(\cdot)$ of degree $t-1$ such that $\delta_i(0)=0$, that is, by choosing $a_{1j}, a_{2j}, \ldots, a_{t-1j} \in \mathbb{Z}_q$ randomly and setting $\delta_i(x)=a_{1j}x+\ldots+a_{t-1j}x^{t-1}$, and sends $\delta_i(j)$ to each other party $P_j$. Then, after receiving all such update information from other parties, each party $P_i$ updates its share to $$s_{i'} = s_i + \sum_{j=1}^{n} \delta_j(i)$$

and deletes the old share $s_i$ and all the update information it received. In this way, the polynomial of the secret sharing scheme is updated to $$f'(\cdot) = f(\cdot) + \sum_{i=1}^{n} \delta_i(\cdot)$$

with $f'(0)=w$.

The proactivization scheme above is secure against a passive adversary: An adversary following the scheme cannot learn the secret with access to no more than $t-1$ shares in one epoch. However, an active adversary may try to destroy the secret by sending wrong update information to other parties, e.g., by choosing a polynomial $\delta_i$ such that $\delta_i(0) \neq 0$, or sending values that don't lie on the same polynomial to other parties. To avoid this, Herzberg et al. propose a verifiable version of the proactivization scheme where, after generating polynomial $\delta_i(\cdot)$, party $P_i$ broadcasts $g^{a_{1j}}, g^{a_{2j}}, \ldots, g^{a_{t-1j}}$ to all other parties, where g is a generator of the group $\mathbb{Z}_q$, and upon receiving the update information $u_{ij}$ from $P_i$, party $P_j$ checks if $$(g^{a_{1j}})^j + (g^{a_{2j}})^{j^2} + \ldots + (g^{a_{t-1j}})^{j^{t-1}} \overset{?}{=} u_{ij}.$$

If the check passes, $u_{ij}=\delta_i(j)$ and $P_j$ accepts the update information; otherwise, $P_j$ and $P_i$ enter an accusation phase which, assuming an honest majority amongst parties, i.e., $t<n/2$, ensures identification of the dishonest party. If $t=O(n)$, then, the overall communication complexity for share proactivization is $O(n^2)$ and $O(n^3)$, when passive and, respectively, active security is achieved.

Share Recovery:

Herzberg et al. also proposed a share recovery scheme that can be used to restore corrupted or lost shares. To recover a share $s_r$ with ID r, all other parties could naively send their shares to $P_r$, who can then interpolate the polynomial and compute $s_r$, but this clearly reveals all shares (and the secret itself) to $P_r$. Instead, every party $P_i$ masks its share by a random value by selecting a random polynomial $\delta_i(\cdot)$ such that $\delta_i(r)=0$ and sending $\delta_i(j)$ to every other party $P_j$ except $P_r$. Then, upon receiving all $\delta_i(j)$ from all other parties, party $P_j$ computes a masked version of its share as $$s_j = s_j + \sum_i \delta_i(j)$$

and sends $s_j$ to party $P_r$. In this way, $P_r$ can interpolate the received masked shares to compute the masked polynomial $\overline{f}(x)=f(x)+\Sigma_i\delta_i(x)$, which by construction agrees with $f(x)$ at point r, and then finally compute $s_r=\overline{f}(r)=f(r)$. To deal with active adversary, the above verification technique is applied, where for each polynomial $\delta_i(\cdot)$, party $P_i$ also broadcasts its coefficients on the exponent $g^{a_{1j}}, \ldots, g^{a_{t-1j}}$ for others to check the correctness of the received share $\delta_i(j)$.

Bilinear Pairings:

Let $\mathbb{G}$, $\mathbb{G}_T$ be two cyclic multiplicative groups of order p generated by $g \in \mathbb{G}$, such that there exists a map $e: \mathbb{G} \times \mathbb{G} \rightarrow \mathbb{G}_T$ with the following properties: (1) Bilinearity: $e(P^a, Q^b)=e(P, Q)^{ab}$ for all $P, Q \in \mathbb{G}$ and $a, b \in \mathbb{Z}_p$; (2) Non-Degeneracy: $e(g,g) \neq 1$; (3) Computability: There is an efficient algorithm to compute $e(P, Q)$ for all $P, Q \in \mathbb{G}$. pub=(p, $\mathbb{G}$, $\mathbb{G}_T, e, g) \leftarrow \text{BilGen}(1^k)$ denotes the bilinear pairings parameters, output by a PPT (Probabilistic Polynomial Time) algorithm BilGen on input $1^k$.

FIG. 1 illustrates an exemplary password-based secret sharing technique 100. As noted above, the PBSS scheme is an extension of Shamir's (t,n) threshold Secret Sharing Scheme that allows the secure selection of one or more shares, called fixed shares, in accordance with a set of corresponding predetermined fixed values, which are provided as additional inputs to the secret sharing algorithm.

As shown in FIG. 1, a key 110 (or other secret information) and a user password 120 are applied to a Shamir secret sharing scheme 130, such as a (2, 3) scheme. The exemplary (2, 3) scheme splits the exemplary key 110 into three shares. In the embodiment of FIG. 1, the key 110 is split into two non-fixed shares 150-1 and 150-2 and one fixed share 150-3, referred to as a password share. The password share 150-3 is obtained, for example, by applying a hash function, h, to the user password 120. The password share 150-3 is typically not explicitly stored.

Constructions for Proactive PBSS

Proactivization of PBSS

To define proactive PBSS, the original definition of proactive secret sharing by Herzberg et al. is followed in one or more embodiments, appropriately adjusted to capture fixed shares and any unavoidable leakage due to their corresponding known distributions.

Generally, proactivization schemes aim to refresh the shares 150 in a current sharing while maintaining the same secret (key) 110. In one or more exemplary embodiments, the disclosed proactivization techniques employ the generation of a set of correction shares (e.g., one for each party in the sharing), which are individually added to the set of existing shares in a PBSS sharing to eventually refresh the sharing to a new one. The correction shares are defined by a corresponding correction polynomial $g(\cdot)$. Proactivizing an initial sharing $(s_1, \ldots, s_n)$ of the standard version of a $(t,n)$ threshold Shamir scheme amounts to randomly choosing polynomial $g(\cdot)$, subject to the condition $g(0)=0$, and then setting the refreshed new sharing $(g(1)+s_1, \ldots, g(n)+s_n)$, that is, perturbing each existing share $s_i$ by adding a random offset $g(i)$ (see, e.g., Amir Herzberg et al., "Proactive Secret Sharing or: How to Cope with Perpetual Leakage," Advances in Cryptology—CRYPTO '95, Proc. 15th Annual Int'l Cryptology Conf., 339-352 (Aug. 27-31, 1995)).

In the case of password-based secret sharing, however, the proactivization method is modified to allow support of fixed refreshed shares. Specifically, a polynomial $g(\cdot)$ is selected to generate one or more correction shares that when combined with the corresponding existing shares produce refreshed shares that take fixed predefined values. By design, inspired by the partial polynomial randomization technique in U.S. patent application Ser. No. 14/672,507, referenced above, where the chosen polynomial is random subject to one or more conditions related to the fixed shares, the correction polynomial $g(\cdot)$ is defined by conditioning on the set of desired predetermined values that the fixed refreshed shares must take. Note that generally the set of fixed refreshed shares may be different from the set of fixed initial shares.

Figure 2:
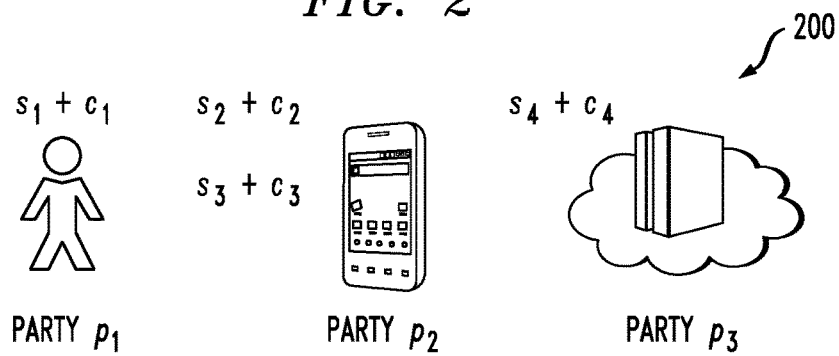
FIG. 2 illustrates an exemplary technique for proactivization of PBSS in accordance with one or more embodiments of the invention.

FIG. 2 illustrates an exemplary technique 200 for proactivization of PBSS. As shown in FIG. 2, one or more correction shares, such as correction shares $c_1$ through $c_4$, that when combined with the corresponding existing shares 150, such as existing shares $s_1$ through $s_4$, produce refreshed shares that take fixed predefined values. As discussed further below, for example, in conjunction with FIG. 4, one or more of the parties, such as parties $p_1$ through $p_3$, reliably select the randomness used to generate the correction shares $c_1$ through $c_4$.

Figure 3:
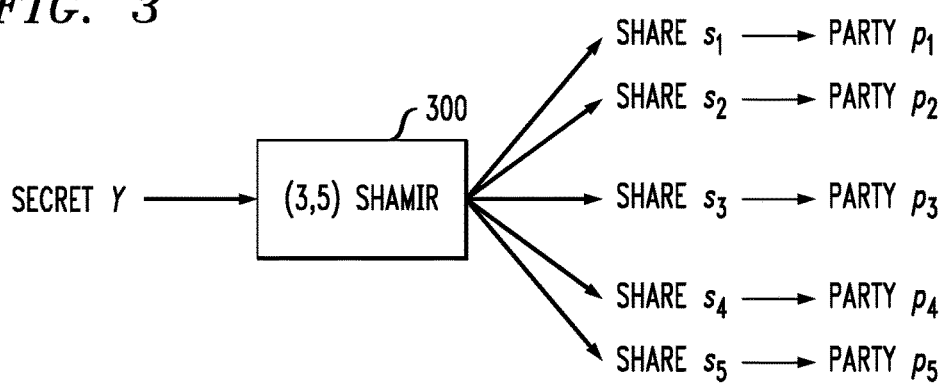
FIG. 3 illustrates an exemplary Shamir's (3,5) threshold scheme where secret Y is shared among a plurality of parties through an initial secret sharing.

FIG. 3 illustrates an exemplary Shamir's (3,5) threshold scheme 300, where secret Y is shared among parties $P=\{p_1, p_2, p_3, p_4, p_5\}$ through initial sharing $S=\{s_1, s_2, s_3, s_4, s_5\}$, and where any three or more shares suffice to reconstruct Y, but no pair of shares alone. Let p be the prime order of the finite field $Z_p$ over which the polynomials in Shamir's scheme are defined, where $Y<p$. Assume that $s_1$ has been selected as a fixed share $\Pi$ that is associated with secret information $\pi$ of party $p_1$. The goal is to proactivize sharing s to a refreshed sharing $S'$ such that (without loss of generality) $p_1$'s refreshed share $s_1'$ remains the same, i.e., $s_1'=s_1$.

Without loss of generality, assume that time is divided into epochs, i.e., time periods of some fixed duration, and the clocks of all parties are synchronized. Considering such epochs correspond to considering that share proactivization occurs periodically with some predefined period (which is a system parameter). It is noted, however, that share proactivization can also occur on demand, e.g., whenever a share holder decides that it needs to have its share refreshed to a new, fixed or non-fixed, fresh share, and accordingly notifies the other share holders to initiate the disclosed distributed proactivization protocol. In this case, again, an adversary still needs to learn t or more shares in one epoch (i.e., the period of sharing refreshing or the time interval between two consecutive proactivized sharings take place) in order to successfully reconstruct the secret.

At the beginning of each time period, the share holders, also often generically called parties or servers, perform an interactive protocol to update their shares for the same secret by individually combining (e.g., via addition) their old, current, shares with the computed correction shares, during an update phase. At the end of the update phase, the servers erase their old shares. Updated shares can either be refreshed shares, i.e., non-fixed shares that get new re-randomized values, or updated shares, i.e., fixed shares that are chosen to get some predefined values that are independent of the shared secret. In particular, a subset of parties can decide to update their shares to fixed values, and $S_i^t$ denotes the distribution of the share, or a random variable behaving according to this distribution, for such party $P_i$ that gets a fixed share in time period t. The values that the non-fixed shares of other parties get should be uniformly distributed after the update phase. An adversary can corrupt a party at any moment of a time period. If an adversary corrupts $P_i$ during an update phase, it is considered to corrupt $P_i$ during both periods adjacent to the update phase. Assume that the adversary cannot corrupt more than $t-1$ parties in any time period.

Intuitively, security for proactive PBSS is captured in a way that an adversary cannot learn the secret or the difference $$(\Delta_i = s_i^{t+1} - s_i^t)$$

between the new share and the old share of any party $P_i$ in any period t. Shannon entropy $H(\cdot)$ of a random variable is employed.

Security of Proactive PBSS:

$s_{Adv}$ is the information learned by the adversary. A proactive PBSS is substantially secure, if:

1. For any time period t, $H(S|s_{Adv}) \geq \min(H(S), \min(H(S_\pi)))$, where $\min(H(S_\pi))$ is a minimum entropy for distributions of fixed shares in or before t; and optionally if additionally:

2. For any two adjacent periods t and t+1, for any party $P_i$ that is not corrupted in either period, $$H(S_i^t, S_i^{t+1} | s_{Adv}) = \min(H(S_\pi^t)) + \min(H(S_\pi^{t+1})),$$

where min $$(H(S_\pi^t))$$

and min $$(H(S_\pi^{t+1}))$$

are the minimum entropies for distributions of fixed shares in t and t+1.

The second condition is optional in the sense that it offers an additional privacy protection.

Consider a single party $P_l$ who currently possesses a fixed or non-fixed share $s_l=\pi$ and, during the proactivization, wants its share to be updated to fixed value $s_l=\pi'$ chosen by $P_l$ itself. Recall that the above exemplary security definition of proactivization with fixed shares dictates that, in one or more embodiments, an adversary $\mathcal{A}$ with access to no more than t–1 shares in one epoch can learn no information about the secret other than what is possibly implied by predicting the weakest fixed share used so far (i.e., the fixed share coming from a known distribution that has the lowest entropy), and additionally, if $\Delta=\pi'-\pi$, that if $\mathcal{A}$ does not control party $P_l$, then $\mathcal{A}$ learns no information about $\Delta$ (or $\pi, \pi'$); if $\mathcal{A}$ controls party $P_l$, $\mathcal{A}$ cannot learn the update value of all other parties, again, other than what is implied through the lowest-entropy fixed shares in the period before and after the update phase (except, of course, for the shares of those parties that are explicitly controlled by the adversary).

Note that the "new fixed share $\pi'$" typically means a new password, and in this case the actual fixed value used is an appropriate cryptographic hash of such password $\pi'$. Similarly, if without loss of generality, it is additionally assumed that the current share $\pi$ is also a fixed share, then the actual fixed value used is an appropriate cryptographic hash of such password $\pi$, and in this case $\pi'$ is an updated password.

Single Password

An exemplary main proactivization protocol runs among n parties and supports only one fixed share held by a single party and, as always, a reconstruction threshold t.

Main Protocol (One Password, Passive Security):

The exemplary main protocol is divided into two parts, an initialization phase and a proactivization phase.

Initialization: The dealer executes a PBSS scheme. Let w be the secret that is shared, $f(\cdot)$ the polynomial used by the scheme, $s_i$ the share of party $P_i$, i=1, ..., n, and $s_l=\pi$ a fixed share, for a given value l∈[1:n].

Proactivization:

(a) $P_l$ announces that it wants to update its share to a fixed value and sets its new, updated, share to $s_l=\pi'$. Let $\Delta=\pi'-\pi$ denote the difference of the values that the fixed share receive (after and before the proactivization part).

(b) $P_l$ chooses randomly a correction polynomial $\delta_l(\cdot)$ such that $\delta_l(0)=0$ and $\delta_l(l)=\Delta$.

(c) $\forall i \neq l$, $P_i$ chooses randomly a correction polynomial $\delta_i(\cdot)$ such that $\delta_i(0)=0$ and $\delta_i(l)=0$.

(d) $\forall i$, $P_i$ sends $\delta_i(j)$ to $P_j$, $\forall j \neq i$.

(e) $\forall i \neq l$, after receiving an update value from other parties (sent in Step 4), $P_i$ updates its share to $$s_{i'} = s_i + \sum_{j=1}^{n} \delta_j(i),$$

where $$\sum_{j=1}^{n} \delta_j(i)$$

is the share for party $P_i$ that is jointly computed by all parties but only locally learned by party $P_i$.

Main Hardened Protocol (One Password, Active Security):

The main protocol described above is substantially secure against essentially any passive adversary. To optionally protect against an active adversary, the share verification technique of Herzberg et al., referenced above, is applied to the above exemplary main protocol. In particular, after choosing the polynomials in the proactivization part of the protocol, let $\delta_i(x)=a_{1,i}x+a_{2,i}x^2+ \ldots +a_{t-1,i}x^{t-1}$ be the random polynomial that was chosen by party $P_i$ so that $\delta_i(l)=0$, if i≠l, or else $\delta_i(l)=\Delta$. The proactivization part of the main protocol is augmented by adding a share verification process that verifies the correctness of all correction polynomials chosen by the parties and comprises the following additional steps (which can be combined or interleaved with the steps of the main protocol above):

1. $P_l$ broadcasts $g^{\alpha_{1l}}$, $g^{\alpha_{2l}}$, ..., $g^{\alpha_{t-1,l}}$ and $g^{\Delta}$ to all other parties.

2. $\forall i \neq l$, $P_i$ broadcasts $g^{\alpha_{1i}}$, $g^{\alpha_{2i}}$, ..., $g^{\alpha_{t-1,i}}$ to all other parties.

3. The parties perform the following checking steps:

(a) $P_l$ checks if $$(g^{\alpha_{ij}t})g^{\alpha_{2j}})^{l^2} + \ldots + (g^{\alpha_{t-1,j}})^{l^{t-1}} \stackrel{?}{=} 0$$

for all i≠l.

(b) $\forall j \neq l$, after receiving updated value $u_{ij}$ from party $P^i$ (in Step 4), party $P_j$ checks:

$$(g^{\alpha_{1j}j})+(g^{\alpha_{2j}j})^2 + \ldots (g^{\alpha_{t-1,j}j})^{t-1} \stackrel{?}{=} u_{ij};$$

and ii. if i≠l, $$(g^{\alpha_{ij}})^1 +(g^{\alpha_{2j}})^{l^2} + \ldots +(g^{\alpha_{t-1,j}})^{l^{t-1}} \stackrel{?}{=} 0;$$

or if $i=l$, $$(g^{\alpha_{1i}})^l+(g^{\alpha_{2j}})^{l^2} + \ldots +(g^{\alpha_{t-1,j}})^{l^{t-1}} \stackrel{?}{=} \Delta.$$

(c) If all of these checks are successful, the protocol terminates with party $P_j$ accepting the update values it receives from the other parties and normally executing Step 5 of the main protocol above for computing the correction shares and locally updating the share each party holds.

Otherwise, the parties involved in any failed check, namely, parties $P_l$ and $P_i$ or parties $P_j$ and $P^i$, enter an accusation phase as described above.

In one or more embodiments, the communication complexity of the passive protocol and the active protocol are substantially the same as the original Herzberg et al. proactivization scheme asymptotically. Moreover, the complexity for party $P_l$ is of particular interest, because in practice, this party may be a human being. Thus it may only be able to perform limited functionalities. In this protocol, $P_l$ does not receive update values.

Note that in one or more embodiments of both protocols (the main protocol and the above hardened extension with active security) the identifier (ID) of the party who wants to update to a fixed value may be leaked. Also, note that in both protocols the threshold during the update phase is effectively lowered by 1. Indeed, if the adversary controls t–1 parties during the update phase and $P_l$ is not controlled by the adversary, then the adversary will receive t–1 points of polynomial $\delta_l(\cdot)$, but by knowing the (possibly publicly available) protocol, the adversary also knows that $\delta_l(0)=0$. Therefore, since the degree of $\delta_l(\cdot)$ is t–1, the adversary can learn all the coefficients of $\delta_l(\cdot)$ and compute $\Delta=\delta_l(l)$. This may break the security definition in one or more embodiments. However, the adversary can learn no information if the adversary has access to no more than t–2 parties during the update phase because in this case the threshold during the reconstruction phase is effectively still t. This possible leakage issue is addressed in one or more embodiments by adding extra protections to the generalized proactivization protocols that support more than one fixed shares and are described in the next section.

Multiple Passwords

The disclosed proactivization techniques can be generalized to support more than one fixed share. Let there be m parties $P_{l_1}, P_{l_2}, \ldots, P_{l_m}$ with fixed (without loss of generality) shares $s_{l_1} = \pi_1, s_{l_2} = \pi_2, \ldots, s_{l_m} T = \pi_m$ that want to change their shares to $\pi'_1, \ldots, \pi'_m$ in the refreshed sharing so that the corresponding differences are $\Delta_1 = \pi'_1 - \pi_1, \ldots, \Delta_m = \pi'_m - \pi_m$. In another variation, one or more of parties $P_{l_1}, P_{l_2}, \ldots, P_{l_m}$ that desire fixed shares in the new sharing may have had non-fixed shares in the prior sharing.

In addition, in one or more embodiments, security is improved by substantially preventing leakage to the attacker of information about the correction shares. Here, to protect against such leakage, techniques are employed for increasing the degree of the underlying polynomial used for secret sharing, and also for securely recovering a (lost or forgotten) share.

FIG. 4 is a flow chart illustrating an exemplary implementation of a process 400 for distributed proactivization of PBSS for multiple passwords and active security. During an initialization phase, a dealer executes a PBSS scheme to split a secret w into a plurality of shares, including at least one fixed share.

As shown in FIG. 4, the exemplary process 400 comprises the following steps:

Multiple fixed shares can be supported by the generalized protocol with a proactivization part being extended as follows.

1. For i=1, 2, . . . , m, $P_{l_i}$ announces that it wants to update its share to a fixed value and sets its share to $s_{l_i} = \pi'_i$.

2. For i=1, 2, . . . , m, $P_{l_i}$ chooses randomly a correction polynomial $\delta_{l_i}(\cdot)$ such that $\delta_{l_i}(l_i) = \Delta_i$, $\delta_{l_i}(0) = 0$ and $\forall j \in \{1, \ldots, m\} \setminus \{i\}, \delta_{l_i}(l_j) = 0$.

3. $\forall i \in \{l_1, \ldots, l_m\}$, $P_i$ chooses randomly a correction polynomial $\delta_i(\cdot)$ such that $\delta_i(0) = 0$ and $\forall j \in \{1, \ldots, m\}, \delta_i(l_j) = 0$.

4. $\forall i$, $P_i$ sends $\delta_i(j)$ to $P_j$, $\forall j \neq i$.

5. $\forall i \in \{l_1, \ldots, l_m\}$, $P_i$ updates its share to $$s_{i'} = s_i + \sum_{j=1}^{n} \delta_j(i).$$

6. Optionally, parties engage into a share verification process to verify the correctness of all correction polynomials chosen by the parties and accordingly resolve possible conflicts via an accusation phase.

Note that the generalized protocol can optionally support active security. Similar to the single-password protocols, however, the $\Delta$ values may be leaked to the adversary also in this generalized version, unless during the update phase the adversary cannot control more than t−m−1 parties. Thus, the generalized protocol may also suffer from the identified "low threshold" problem during the update phase, as it has been described above.

Strengthened Generalized Protocol (No Leakage):

To address this potential problem, an improved generalized protocol with multiple passwords and active security is provided in one or more embodiments that is optionally strengthened to experience substantially no leakage of $\Delta$ values as follows. First, in the initialization phase, a PBSS scheme is employed, where the original (t,n) Shamir's Secret Sharing Scheme is replaced by a (2t−1, n) scheme where t−1 shares are public, according to a public shares update process 500, as discussed further below in conjunction with FIG. 5. In this way, t shares (jointly contributed by the parties and combined with the public shares) can still reconstruct the secret, while t−1 shares leak nothing (even when combined with the public shares). The only difference is that the degree of the polynomial $f(\cdot)$ is raised to 2t−2. Then, the generalized protocol that was presented above is run, where some steps are appropriately revised consistently with the higher-degree polynomial and the existence of public shares. In particular, the adversary now is allowed to control t−1 parties during the update phase and still cannot learn any $\Delta$ or the secret. Finally, the share recovery technique of Herzberg et al. (described above) is employed to update the public shares. The detailed protocol and its analysis are presented below.

Initialization: The dealer executes a password-based secret sharing scheme. Let w be the secret that is shared, $f(\cdot)$ be the polynomial of degree 2t−2 that is used by the scheme and $s_i = f(i)$ be the share of party $P_i$ for i=1, 2, . . . , n, where the current shares of parties $P_{l_1}, P_{l_2}, \ldots, P_{l_m}$ are (without loss of generality) fixed and where the new shares of parties $P_{l_1}, P_{l_2}, \ldots, P_{l_m}$ will be fixed in refreshed sharing with $\Delta_{l_i}$ defined as before for given values $l_1, \ldots, l_m$. The dealer publishes $f(n+1), \ldots, f(n+t−1)$ as public shares.

Proactivization: Shares are being updated as in the generalized protocol, but now each $\delta(\cdot)$ has degree 2t−2.

FIG. 5 is a flow chart illustrating an exemplary implementation of a public shares update process 500 for distributed proactivization of PBSS for multiple passwords and active security with reduced leakage. As shown in FIG. 5, the exemplary public shares update process 500 comprises the following steps:

(a) Let $$g(\cdot) = f(\cdot) + \sum_{i=1}^{n} \delta_i(\cdot)$$

be the refreshed polynomial after the proactivization phase, that is, $\forall i$, $s'_i = g(i)$ when the share-correction computation is executed correctly. For simplicity, assume that each public share is managed by a party $j \in \{n+1, \ldots, n+t−1\}$, where the notation is slightly abused to index the party that manages a public share corresponding to point $j \in \{n+1, \ldots, n+t−1\}$ with the point j itself, instead of indexing it with $i = \phi(j)$, that is, through a function $\phi(\ )$, mapping a point j to the index i in $\{1, \ldots, n\}$ of the party $P_i$ that manages the public share evaluated at point j.

(b) For each i=1, 2, . . . , n, $P_i$ chooses a random polynomial $\gamma_{ij}(\cdot)$ of degree 2t−2 for each j=n+1, . . . , n+t−1 such that $\gamma_{ij}(j) = 0$.

(c) For each i=1, 2, . . . , n and j=n+1, . . . , n+t−1, $P_i$ sends $\gamma_{ij}(k)$ to $P_k \forall k \in \{1, 2, \ldots, n\} \setminus \{i\}$.

(d) For each i=1, 2, . . . , n and j=n+1, . . . , n+t−1, $P_i$ computes $$r_{ij} = s'_i + \sum_{k=1}^{n} \gamma_{kj}(i)$$

and sends it to party j that controls the corresponding public share.

(e) For each j=n+1, . . . , n+t−1, party j receives n points on the polynomial $$h(\cdot) = g(\cdot) + \sum_{i=1}^{n} \gamma_{ij}(\cdot).$$

It interpolates the polynomial and computes $$h(j) = g(j) + \sum_{i=1}^{n} \gamma_{ij}(j) = g(j). \ h(j)$$

is published as a public share.

During the public-shares update phase, an adversary with access to t−1 parties can receive t−1 points for a polynomial $\delta_{l_i}(\cdot)$ chosen by $P_{l_i}$ with fixed share. In addition, $\delta_{l_i}(0)=0$ and $\delta_{l_i}(1_j)=0$, $\forall j \in \{1, \ldots, m\}\setminus\{i\}$. As m≤t−2, the adversary knows t+m−1≤2t−3 points of $\delta_{l_i}(\cdot)$. As the degree of $\delta_{l_i}(\cdot)$ is 2t−2 the adversary cannot interpolate it to learn $\Delta_i$. Furthermore, after the update of public shares, the adversary may learn the differences between old and new public shares. However, these values correspond to the polynomial $$\sum_{i=1}^{n} \delta_i(\cdot),$$

not to any particular $\delta_i(\cdot)$. Therefore, the public shares leak no extra information for each individual difference $\Delta$.

Note that an active adversary can be tolerated by activating the optional share-verification technique that is embedded in the generalized proactivization phase but also applying this technique during the public-shares update phase. Thus, in this case and in addition to securely broadcasting the coefficients of the correction polynomials $\delta_i(\cdot)$, each party also securely broadcasts all the coefficients of the polynomial $\gamma_{ij}(\cdot)$ that it has chosen during the public-shares update phase, and all other parties check the correctness of each evaluated values of $\gamma_{ij}(\cdot)$ that thay have received during this phase. Here again, securely broadcasting means that every coefficient c is broadcasted in a "hidden-in-the-exponent" form, that is, c is masked in the form $g^c$. Actually, when share verification is used, the assumption that each public share is controlled by some specific party can be easily removed. A public share can be updated by any existing party, and then verified by others. As the share will be published anyway, this leaks no information to the party that is responsible for the update.

The communication complexity is $O(n^3)$ without verification, and is $O(n^4)$ with verification.

Variations

In one or more embodiments, efficiency of the previous protocols can be further improved using techniques from verifiable computing that are related to polynomial evaluations.

The major overhead of the above scheme comes from the verification and the public share recovery. In particular, to verify the correctness, for each polynomial generated, e.g., $\delta_i(\cdot)$ and $\gamma_{ij}(\cdot)$, the party needs to broadcast all the coefficients on the exponent, which is an O(n) overhead. In one exemplary variation for share verification, based on bilinear maps, both the communication and the computation complexities are reduced.

During the initialization, the dealer in addition runs pub= $(p,G,,G_T,e,g) \leftarrow \text{BilGen}(1^k)$ and selects randomly $s \in Z_p$. The dealer publishes pk=pub, $g^s, \ldots, g^{s^d}$ as the public key. The dealer also publishes $g^f(s)$.

For each polynomial generated during the proactivization, $\delta_{l_i}(\cdot)$ is taken for $i \in \{1, \ldots, m\}$. As an example, the following properties need to be verified by every other party: (1) $\delta_{l_i}(0)=0$; (2) $\forall j \in \{1, \ldots, m\}\setminus\{i\}$, $\delta_{l_i}(1_j)=0$: (3) where $\Delta_i$ is the desired shift for party $P_{l_i}$ and $g^{\Delta_i}$ is broadcasted by $P_{l_i}$; (4) the shift $\delta_j$ received is the evaluation of polynomial $\delta_{l_i}(\cdot)$ at point j.

FIGS. 6 and 7 are flow charts illustrating exemplary implementations of share verification processes 600, 700 for fixed-share parties and non-fixed-share parties, respectively, for an improved distributed proactivization of PBSS. Each $P_{l_i}$ runs the exemplary fixed-share party share verification process 600 shown in FIG. 6. An exemplary implementation of the fixed-share party share verification process 600 comprises the following steps:

1. Computes and broadcasts $$d=g^{67} \text{ is } \mathbf{1}^{i \, )ds \, (s)}.$$

2. Computes the polynomial $p(x)=(\delta_{l_i}(x)-\Delta_i)/(x-l_i)$ and broadcasts $w_1=g^{p(s)}$.

3. Computes the polynomial $q(x)=\delta_{l_i}(x)/(x \cdot \Pi_{j \in \{1, \ldots, m\}\setminus\{i\}} (x-l_j))$ and broadcasts $w_2=g^{q(s)}$.

4. Computes the polynomial $t(x)=x \cdot \Pi_{j \in \{1, \ldots, m\}\setminus\{i\}} (x-l_j)$ and broadcasts $w_3=g^{t(s)}$.

5. For every other party $P_j$, computes $w_j(x)=(\delta_{l_i}(x)-\delta_{l_i}(j))/(x-j)$ and sends $\delta_j=\delta_{l_i}(j)$, $w_4=g^{w_j(s)}$ to $P_j$.

Upon receiving the information above, every other party $P_j$ runs the non-fixed-share party share verification process 700 shown in FIG. 7. An exemplary implementation of the non-fixed-share party share verification process 700 comprises the following steps:

1. $e(d/g^{\delta_j},g)(g^{s-j},w_4)$. This checks if $\delta_j$ is the evaluation of $\delta_{l_i}(\cdot)$ at point j, which corresponds to property (4).

2. $e(d/g^{\Delta_i},g)(g^{s-l_i},w_1)$. This checks if the exponent of $g^{\Delta_i}$ is the evaluation of $\delta_{l_i}(\cdot)$ at point $l_i$, which corresponds to property (3).

3. $e(d,g)(w_2,w_3)$. This checks if the polynomial on the exponent of d is the product of two polynomials on the exponent of $w_2$ and $W_3$.

4. Selects randomly $r \in Z_p$ and sends r to $P_{l_i}$.

5. Upon receiving r from $P_j$, $P_{l_i}$ computes t(r) and $u(x)=(t(x)-t(r))/(x-r)$. It sends $w_5=t(r)$ and $w_6=g^{u(s)}$ back to $P_j$.

6. $P_j$ checks $e(w_2/g^{w_5}, g)(g^{s-r}, w_6)$ and $w_5 \cdot \Pi_{j \in \{1, \ldots, m\}\setminus\{i\}} (r-l_j)$. This checks if $w_2=g^{t(s)}$.

Together with check 3, the polynomial on the exponent of d has a factor t(x), which corresponds to property (1) and (2).

Another variation is provided for the share recovery. Instead of $P_i$ selecting one polynomial $\gamma_{ij}(\cdot)$ for each public share such that $\gamma_{ij}(j)=0$, $P_i$ selects a polynomial $\gamma_i(\cdot)$ such that $\gamma_i(j)=0$ for j=n+1, . . . , n+t−2. It then sends $\gamma_i(k)$ to every other party $P_k$.

Upon receiving information from others, each party $P_i$ sets $$r_i = s'_i + \sum_{k=1}^{n} \gamma_k(i)$$

and sends it to a single party who is responsible for updating all public shares. This party runs polynomial interpolation and learns $$h(\cdot) = g(\cdot) + \sum_{i=1}^{n} \gamma_i(\cdot).$$

It evaluates $h(\cdot)$ at $j=n+1, \ldots, n+t-2$ to get all public shares.

The same optimized verification can be applied to check all $\gamma_i(\cdot)$ and all updated public shares. (i.e., the digest $g^{g(s)}$ is known to every party by $g^{g(s)} = g^{f(s)} \cdot \prod_{i=1}^{n} g^{\delta_i(s)}$). The optimized communication complexity is $O(n^2)$ and the computation complexity is $O(n^3)$.

Small Number of Malicious Parties

In one or more embodiments, the above protocols can be extended to achieve optimizations and new tradeoffs in the performance of the PBSS scheme. The disclosed techniques extend the proactivization techniques of Herzberg et al., referenced above, for standard threshold secret sharing (that is, for Shamir's Scheme) to proactivization for PBSS.

The complexity analysis in the previous sections are for the case where $t=O(n)$. If the number of parties controlled by the adversaries is known to be much smaller than n, the complexities can be improved.

During the update phase, instead of every party coming up with a polynomial $\delta_i(\cdot)$, only $2t-1$ parties need to do so to maintain the honest majority property. Note that the m parties who want to change their shares to fixed values are included. Each polynomial has $O(t)$ constrains to be checked. Therefore, the communication complexity becomes $O(tn)$ and the computation complexity becomes $O(t^2n)$.

Similarly, in the public share recovery phase, only $2t-1$ parties need to generate $\gamma_i(\cdot)$ and performs verifications. The communication complexity becomes $O(t^2)$ and the computation complexity becomes $O(t^3)$.

In one variation, the communication complexity can be further reduced to be dependent only on t (i.e., some parties do not change their shares at all). A scheme is provided with a different model. The scheme is generalized to a secret sharing with a gap between the reconstruction threshold and the number of malicious parties. A $(t-1,k,n)$ secret sharing scheme has the property that a party with k shares can reconstruct the secret, while an adversary with $t-1$ shares learns nothing about the secret. $(k>t-1.)$ During the initialization, a polynomial f of degree $k+t-2$ is chosen instead of $2t-2$ and $t-1$ public shares are published. The purpose of doing so is that now the bound of the total number of fixed shares increases to $k-2$.

During the update phase, m parties ($m \leq t-2$) can change their shares to fixed values, and in addition let $k-2-m$ parties to keep their shares unchanged. An unchanged share is simply a special case of a share changed to a fixed value with $\Delta=0$. In this way, these parties need not receive any information to update their shares. Meanwhile, as $t<<n$, only $2t-1$ parties must come up with polynomials $\delta(\cdot)$s. With parameter k chosen properly, these parties with unchanged shares also need not send any information. Therefore, these parties do not need to participate in the whole proactivization.

For example, if $k=n+m-2t+3$, then $n-2t+1$ parties are not involved in the proactivization, while m parties change their shares to fixed values and $2t-1-m$ parties run the previous proactivization protocol. In one or more embodiments, the security is substantially guaranteed because of the honest majority property. In this way, the communication complexity is reduced to $O(t^2)$, while the computation complexity is still $O(t^2n)$ (because now $O(n)$ constrains are checked). Note that $k=n+m-2t+3$ shares are needed to reconstruct the secret.

An application in practice is that one or several shares are passcodes that are cheap and fast to evolve, while other shares are more expensive to participate in proactivizations. In this case, the above scheme can be applied together with regular proactivization to set different update periods and reduce the cost.

CONCLUSION

The foregoing applications and associated embodiments should be considered as illustrative only, and numerous other embodiments can be configured using the techniques disclosed herein, in a wide variety of different cryptography applications.

It should also be understood that the secret sharing, protection and distributed proactivization techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 8:
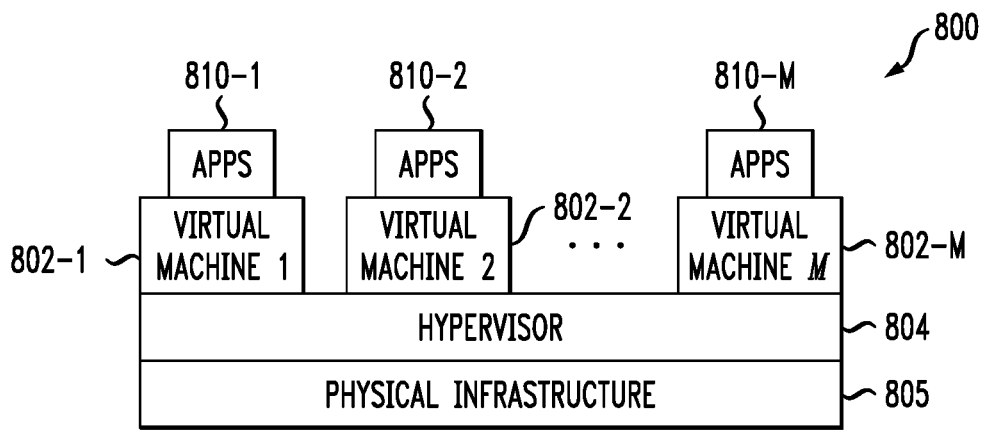
FIG. 8 illustrates an exemplary processing platform that may be used to implement at least a portion of one or more embodiments of the invention comprising a cloud infrastructure.

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, . . . 802-M implemented using a hypervisor 804. The hypervisor 804 runs on physical infrastructure 805. The cloud infrastructure 800 further comprises sets of applications 810-1, 810-2, . . . 810-M running on respective ones of the virtual machines 802-1, 802-2, . . . 802-M under the control of the hypervisor 804.

The cloud infrastructure 800 may encompass the entire given system or only portions of that given system, such as one or more of client, servers, controller, authentication server or relying server in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the secret sharing system, although in other embodiments a given tenant can have multiple containers. The containers may be utilized to implement a variety of different types of functionality within the secret sharing system. For example, containers can be used to implement respective compute nodes or cloud storage nodes of a secret sharing system. The compute nodes or metadata servers may be associated with respective cloud tenants of a multi-tenant environment of a secret sharing system. Containers may be used in combination with other virtualization infrastructure such as virtual machines implemented using a hypervisor.

Figure 9:
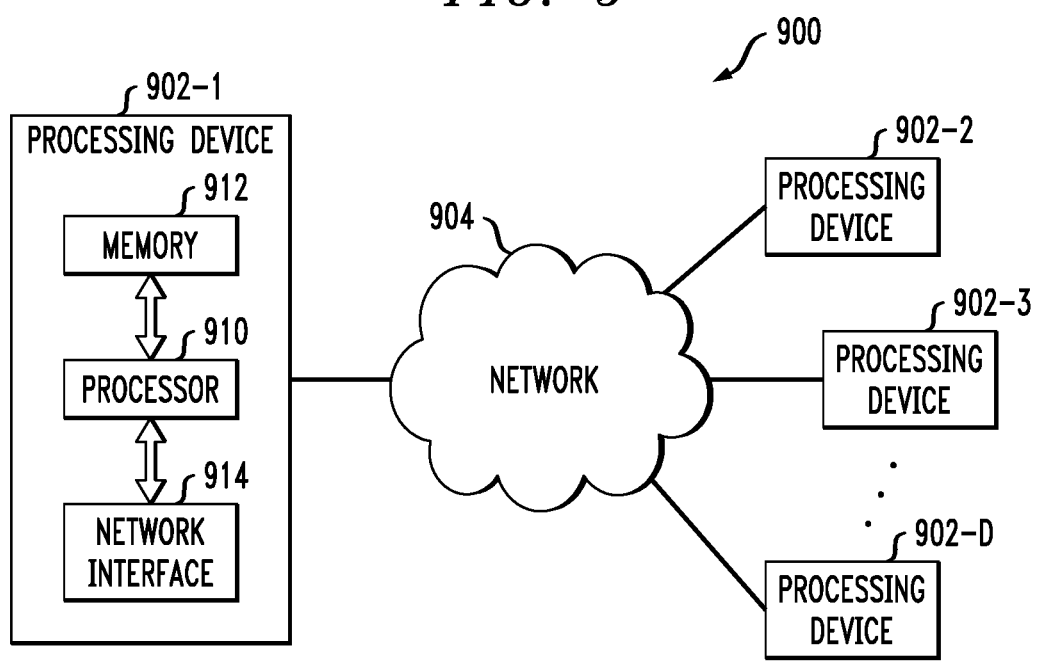
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-D, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from the secret sharing, protection and distributed proactivization techniques, as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    obtaining a difference between an updated value of a share and a prior value of said share for at least one fixed-share party, wherein said updated value comprises a fixed share that is one of a plurality of shares of a secret, wherein said plurality of shares are held by a plurality of parties;
    substantially randomly selecting, by said at least one fixed-share party, a first correction polynomial employed by a polynomial-based secret sharing scheme such that at least one polynomial coefficient corresponding to said at least one fixed-share party is a value that depends on the difference, wherein at least one non-fixed-share party substantially randomly selects a second correction polynomial such that at least one corresponding polynomial coefficient corresponding to said at least one non-fixed-share party is approximately zero;
    obtaining said at least one corresponding polynomial coefficient of said second correction polynomial from said at least one non-fixed-share party; and
    updating said fixed share by combining said prior value of said share with said at least one corresponding polynomial coefficient of said first correction polynomial and said at least one corresponding polynomial coefficient of said second correction polynomial.

2. The method of claim 1, wherein said step of substantially randomly selecting said first correction polynomial further comprises setting a polynomial coefficient corresponding to said secret to approximately zero.

3. The method of claim 1, wherein said step of substantially randomly selecting said first correction polynomial further comprises setting at least one polynomial coefficient of said first correction polynomial corresponding to other parties having at least one fixed share to a value that is approximately zero.

4. The method of claim 1, wherein said at least one non-fixed-share party substantially randomly selects said second correction polynomial such that at least one polynomial coefficient of said second correction polynomial corresponding to parties having at least one fixed share has a value that is approximately zero.

5. The method of claim 1, wherein said difference is zero.

6. The method of claim 1, further comprising the step of performing a share verification process to verify a correctness of correction polynomials chosen by said plurality of parties and resolving zero or more conflicts using an accusation phase.

7. The method of claim 1, wherein said polynomial-based secret sharing scheme comprises a (2t–1, n) secret sharing scheme for said plurality, n, of parties, wherein t shares comprise a minimal authorized set needed for reconstruction of said secret and wherein t–1 of said plurality of shares comprise public shares, wherein said first and second correction polynomials are of degree 2t–2, and wherein said public shares are updated by substantially randomly selecting, by each of said fixed-share parties and said non-fixed-share parties, a third correction polynomial employed by said polynomial-based secret sharing scheme for each party managing a public share, such that coefficients corresponding to said public share parties are approximately zero; wherein each of said fixed-share parties, said non-fixed-share parties and said public share parties sends corresponding coefficients to others of said fixed-share parties, said non-fixed-share parties and said public share parties; wherein each of said fixed-share parties, said non-fixed-share parties and said public share parties computes an update value for a given public share and sends said update value for said given public share to said corresponding public share party; and wherein said corresponding public share party computes said corresponding public share and publishes said corresponding public share.

8. The method of claim 1, further comprising the steps of verifying, for said at least one fixed-share party by at least one additional party, that a coefficient corresponding to said secret is approximately zero, that coefficients of said first correction polynomial corresponding to each additional fixed-share party are approximately zero, a fourth correction polynomial raised to a power based on coefficients of said first correction polynomial corresponding to each of said fixed-share parties is set to said fourth correction polynomial raised to a desired shift of said respective fixed-share party, providing, by said fixed-share parties, said fourth correction polynomial raised to said respective desired shift; and verifying, by said fixed-share parties, that a received shift is substantially equal to an evaluation of said first correction polynomial at a point corresponding to said respective fixed-share party.

9. The method of claim 1, wherein a number of parties compromised by one or more adversaries is known to be significantly less than the total number of parties, and wherein only 2t–1 of said parties randomly select said first correction polynomial, wherein said 2t–1 parties include said fixed-share parties.

10. The method of claim 1, wherein said polynomial-based secret sharing scheme comprises a (t–1,k,n) secret sharing scheme with a gap between a reconstruction threshold and a number of malicious parties, such that a party with k shares can reconstruct the secret, while an adversary with t–1 shares cannot learn the secret, where k>t–1, wherein a polynomial f of degree k+t–2 is chosen and wherein t–1 public shares are published, wherein m parties, where m≤t–2 change their shares to new fixed values, and k–2–m additional parties keep their shares unchanged and do not receive information to update their shares, and wherein only 2t–1 parties compute said first correction polynomial.

11. The method of claim 1, wherein said fixed share is based on one or more of secret information related to said at least one party and a password of said at least one party.

12. The method of claim 11, wherein said at least one polynomial coefficient depends on a value obtained by applying a compressed-range function to said one or more of said secret information related to said at least one party and said password of said at least one party.

13. The method of claim 1, wherein said secret protects at least one data item.

14. The method of claim 1, wherein t shares comprise a minimal authorized set needed for reconstruction of said secret and wherein said t shares must be obtained to reconstruct said secret.

15. A non-transitory machine-readable recordable storage medium, wherein one or more software programs when executed by one or more processing devices implement the following steps:
  obtaining a difference between an updated value of a share and a prior value of said sham for at least one fixed-share party, wherein said updated value comprises a fixed share that is one of a plurality of shares of a secret, wherein said plurality of shares are held by a plurality of parties;
  substantially randomly selecting, by said at least one fixed-share party, a first correction polynomial employed by a polynomial-based secret sharing scheme such that at least one polynomial coefficient corresponding to said at least one fixed-share party is a value that depends on the difference, wherein at least one non-fixed-share party substantially randomly selects a second correction polynomial such that at least one corresponding polynomial coefficient corresponding to said at least one non-fixed-share party' is approximately zero;
  obtaining said at least one corresponding polynomial coefficient of said second correction polynomial from said at least one non-fixed-share party; and
  updating said fixed share by combining said prior value of said share with said at least one corresponding polynomial coefficient of said first correction polynomial and said at least one corresponding polynomial coefficient of said second correction polynomial.

16. An apparatus, comprising:
  a memory, and
  at least one hardware device, coupled to the memory, operative to implement the following steps:
  obtaining a difference between an updated value of a share and a prior value of said share for at least one fixed-share party, wherein said updated value comprises a fixed share that is one of a plurality of shares of a secret, wherein said plurality of shares are held by a plurality of parties;
  substantially randomly selecting, by said at least one fixed-share party, a first correction polynomial employed by a polynomial-based secret sharing scheme such that at least one polynomial coefficient corresponding to said at least one fixed-share party is a value that depends on the difference, wherein at least one non-fixed-share party substantially randomly selects a second correction polynomial such that at least one corresponding polynomial coefficient corresponding to said at least one non-fixed-share party is approximately zero;

obtaining said at least one corresponding polynomial coefficient of said second correction polynomial from said at least one non-fixed-share party; and updating said fixed share by combining said prior value of said share with said at least one corresponding polynomial coefficient of said first correction polynomial and said at least one corresponding polynomial coefficient of said second correction polynomial.

17. The apparatus of claim 16, further comprising the step of performing a share verification process to verify a correctness of correction polynomials chosen by said plurality of parties and resolving zero or more conflicts using an accusation phase.

18. The apparatus of claim 16, wherein said polynomial-based secret sharing scheme comprises a (2t−1, n) secret sharing scheme for said plurality, n, of parties, wherein t shares comprise a minimal authorized set needed for reconstruction of said secret and wherein t−1 of said plurality of shares comprise public shares, wherein said first and second correction polynomials are of degree 2t−2, and wherein said public shares are updated by substantially randomly selecting, by each of said fixed-share parties and said non-fixed-share parties, a third correction polynomial employed by said polynomial-based secret sharing scheme for each party managing a public share, such that coefficients corresponding to said public share parties are approximately zero; wherein each of said fixed-share parties, said non-fixed-share parties and said public share parties sends corresponding coefficients to others of said fixed-share parties, said non-fixed-share parties and said public share parties; wherein each of said fixed-share parties, said non-fixed-share parties and said public share parties computes an update value for a given public share and sends said update value for said given public share to said corresponding public share party, and wherein said corresponding public share party computes said corresponding public share and publishes said corresponding public share.

19. The apparatus of claim 16, further comprising the steps of verifying, for said at least one fixed-share party by at least one additional party, that a coefficient corresponding to said secret is approximately zero, that coefficients of said first correction polynomial corresponding to each additional fixed-share party are approximately zero, a fourth correction polynomial raised to a power based on coefficients of said first correction polynomial corresponding to each of said fixed-share parties is set to said fourth correction polynomial raised to a desired shift of said respective fixed-share party providing, by said fixed-share parties, said fourth correction polynomial raised to said respective desired shift; and verifying, by said fixed-share parties, that a received shift is substantially equal to an evaluation of said first correction polynomial at a point corresponding to said respective fixed-share party.

20. The apparatus of claim 16, wherein t shares comprise a minimal authorized set needed for reconstruction of said secret and wherein said t shares must be obtained to reconstruct said secret.

\* \* \* \* \*